United States Patent [19]

Siebol

[11] Patent Number: 5,006,024

[45] Date of Patent: Apr. 9, 1991

[54] DUAL-LOCK BLIND FASTENER

[76] Inventor: George Siebol, 1402 22nd St. NE., Space 552, Auburn, Wash. 98002

[21] Appl. No.: 488,646

[22] Filed: Mar. 5, 1990

[51] Int. Cl.$^5$ ............................................. F16B 13/06
[52] U.S. Cl. ........................................ 411/43; 411/70
[58] Field of Search ...................... 411/43, 69, 70, 55; 29/507, 512, 523, 525.2

[56] References Cited

U.S. PATENT DOCUMENTS

| 2,526,235 | 10/1950 | Huck | 411/43 |
| 3,657,957 | 4/1972 | Siebol | 411/70 |
| 4,137,817 | 2/1979 | Siebol | 411/43 |
| 4,405,273 | 9/1983 | Ruhl et al. | 411/70 X |
| 4,473,914 | 10/1984 | Haft | 411/43 X |
| 4,765,787 | 8/1988 | Briles | 411/43 X |
| 4,781,501 | 11/1988 | Jeal et al. | 411/43 |
| 4,810,142 | 3/1989 | Briles | 411/43 |
| 4,863,325 | 9/1989 | Smith . | |
| 4,907,922 | 3/1990 | Jeal et al. | 411/43 |

FOREIGN PATENT DOCUMENTS 209951 8/1957 Australia .............................. 411/43

Primary Examiner—Gary L. Smith
Assistant Examiner—Jerry Redman
Attorney, Agent, or Firm—Fulwider, Patton, Lee & Utecht

[57] ABSTRACT

A fastener having an assembly comprising a sleeve and pin for telescoping movement therein useful for clamping together a plurality of work pieces has two mechanical locking structures for locking the pin and sleeve together. One locking mechanism comprises material contained in a reduced diameter section of the sleeve which is formed into a first locking groove of the pin as a result of pulling the pin into the sleeve. A second lock comprises a locking crown formed in the sleeve head which is formed into a second locking groove in the pin by means of increased pulling pressure applied by the setting tool against the locking crown after pin movement has stopped. The design of the pin head is such that a clamping of the work pieces occurs prior to expansion of the sleeve in the apertures of the work pieces and prior to setting the double locks of the pin to the sleeve.

27 Claims, 4 Drawing Sheets

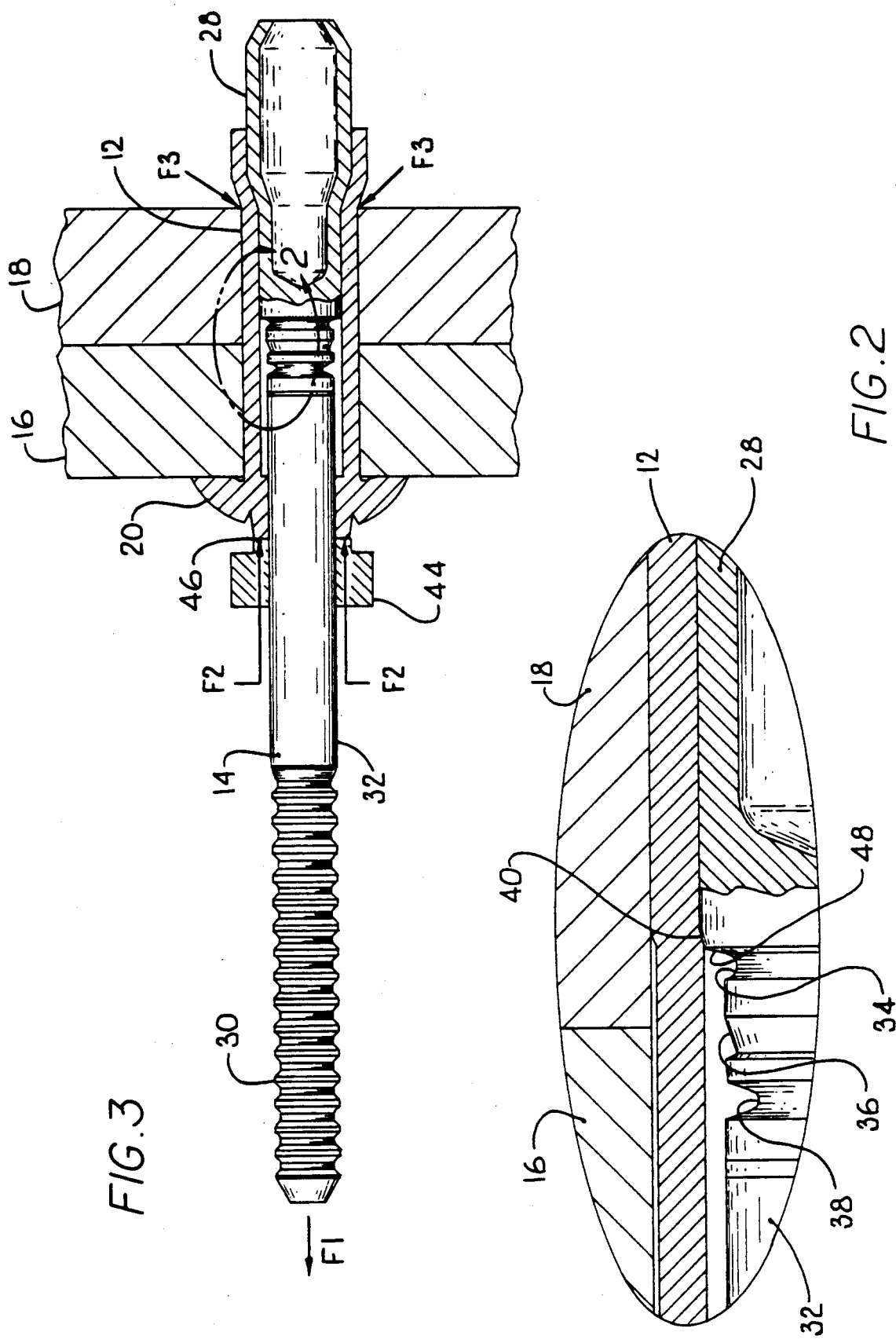

DUAL-LOCK BLIND FASTENER

BACKGROUND

The invention is related generally to fasteners and more particularly, to blind fasteners having a sleeve and setting pin and means for retaining the setting pin in the sleeve.

Where access to work pieces exists on one side of the work only, blind fasteners are often used for fastening the work pieces together. The side of the work from which the fastener is applied is referred to as the "access side" and the other side is referred to as the "blind side." Many blind fasteners comprise two basic parts, a tubular sleeve and a setting pin which moves telescopically in the sleeve. The sleeve typically comprises a radially enlarged head integral with one end thereof which presses against the access side of the work pieces. The sleeve also comprises a shank through which the pin moves.

The pin comprises a "tail" or pulling section at one end which is relatively free to move through the sleeve and projects out the access side of the work pieces. The pin also comprises a head having an outer diameter which is greater than the inner diameter of the sleeve. Prior to use the sleeve and pin are assembled with the pulling section of the pin projecting from the head end of the sleeve and the head of the pin located at or near the shank or blind end of the sleeve.

With the two basic parts in telescoped relation, the fastener customarily is inserted into aligned apertures in the work pieces to be fastened together from the access side thereof, and is positioned with the head of the sleeve on the access side and with the head of the setting pin on the blind side. The pin is pulled from the access side while a restraining force is applied against the sleeve head to hold it in place. This draws the head of the pin into the sleeve shank which results in the shank being radially expanded or "upset" on the blind side to clamp the work pieces together. It is also desirable in setting a blind fastener to expand the sleeve within the apertures in the work pieces into pressure engagement with the walls thereof, thus improving the shear strength of the resulting connection.

Frequently, the work pieces which are to be fastened together are initially separated from each other and must be clamped together during fastening. To achieve this without having to clamp the pieces together by some independent means, it is desirable that the projecting portion of the shank of the sleeve on the blind side be expanded sufficiently to clamp the work pieces together before the shank portion within the apertures is expanded against the walls of the apertures. If this is not done, that is if the expansion of the shank portion within the apertures takes place before clamping, the parts will not be clamped together. This premature expansion of the fastener will lock the pieces in their separated position. Failure to properly clamp the work pieces will preclude the fastened combination from developing either the desired shear or tensile strength. Thus a satisfactory fastener must first operate to clamp the work pieces and then expand within their apertures to secure them in that position.

In prior fasteners, the larger outer diameter head of the pin engages the lesser inner diameter sleeve to form a bulged, bulb-shaped head on the blind side end of the sleeve. As the setting pin is pulled through the sleeve, the expanding sleeve first causes clamping of the work pieces to occur and then causes expansion of the sleeve within the apertures of the work pieces. To enable successful fastening, the size of the apertures in the work pieces are such that the fastener can be easily inserted but with a minimum of clearance.

In some fasteners, there exists a means to stop further movement of the pin after it has been pulled into the sleeve to a certain extent and to lock it in position. Without some locking means, the pin and sleeve may pull apart later, such as when exposed to high levels of vibration. Where the sleeve itself cannot provide the desired shear strength and the additional strength of the pin in the sleeve is required but is not available due to disengagement, unfastening of the work pieces could occur. In some devices, friction alone was used to hold the pin and sleeve together. This method of locking has been found to be inadequate in some applications. A contributing factor to a lack of adequate strength is that the pin and sleeve take on complementary tapered configurations at their juncture surfaces as the pin is drawn into the sleeve. The resulting taper is so directed that the diameter of the juncture surface increases toward the blind end, thus facilitating retrograde movement of the pin out of the sleeve. This retrograde movement may be accelerated by using the assembly in a high vibration environment. Further, the resilient metal of the pin is strained somewhat during the setting so that when the pulling force is rapidly released by fracturing the pin at the breakneck groove, the pin tends to spring back slightly. As a consequence, the clamping force on the work pieces is relaxed somewhat and the joint will loosen somewhat.

Various techniques for locking the pin and sleeve together have been developed. However, many include only a single lock and, depending upon the application, stronger locking of the pin to the sleeve may be required. For example, work pieces which may be used in a high stress or high vibration environment should have fasteners whose components are locked together strongly enough to resist any tendencies to separate when subjected to such vibration.

In view of the foregoing, it would be desirable to provide a pull-type blind fastener which is adapted to provide improved locking of the pin to the sleeve when assembled. It would also be desirable to provide a two piece blind fastener in which the pin and sleeve are mechanically locked together by two locking structures and further, a blind fastener in which the pin and sleeve are mechanically locked together by material from the sleeve.

SUMMARY OF THE INVENTION

The invention provides a fastener having an assembly comprising a sleeve and a pin for telescoping movement in the sleeve, useful for fastening together a plurality of work pieces. The fastener has two mechanical locking structures for locking the pin and sleeve together. One locking structure comprises material contained in a reduced diameter section of the sleeve near the sleeve head. Pulling force applied to the pin causes some of this material to be formed into a first locking groove in the pin.

A second lock structure comprises a locking crown in the head of the sleeve which is formed to exert axial compressive forces into a second locking groove in the pin. After movement of the pin has stopped due to actuation of the first locking structure, continued pulling force on the pin causes the locking crown of the sleeve to be compressively formed into the second locking groove of the pin. Continued pulling causes the break-neck groove to fracture.

The design of the pin is such that its head is larger than the inside diameter of the sleeve and this disparity causes the sleeve to bulge and clamp the work pieces together as the pin is being pulled through the sleeve. Continued pulling causes the sleeve to expand and fill the apertures in the work pieces for greater fatigue and shear strength.

BRIEF DESCRIPTION OF THE DRAWINGS

The novel features which are believed to be characteristic of the invention, both as to its structure and method of operation, together with further objects and advantages thereof will be more readily understood from the following descriptions considered in connection with the accompanying drawings in which:

FIG. 2 is an enlarged view of the pin of FIG. 1 showing its interference fit with the sleeve;

FIG. 3 is a partially cut-away side view of a fastener assembly in accordance with the principles of the invention showing the pin partially pulled into the sleeve and the workpieces clamped together;

DESCRIPTION OF THE PREFERRED EMBODIMENTS

Figure 1:
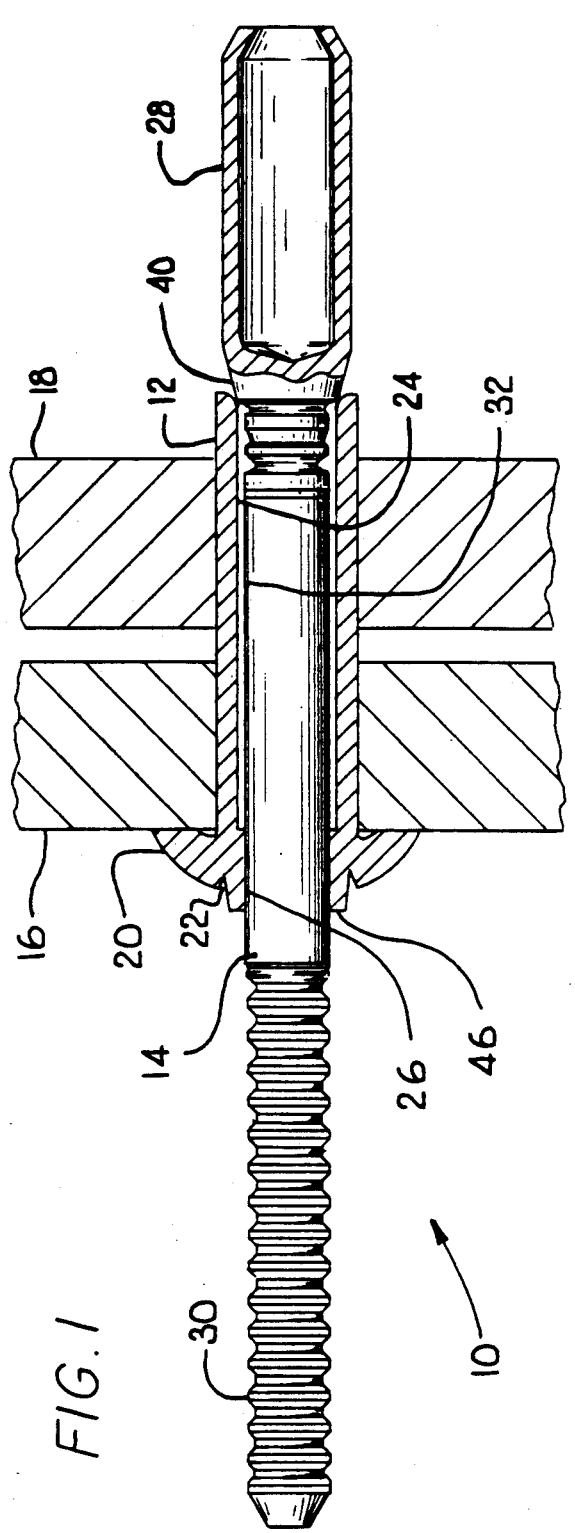
FIG. 1 is a partially cut-away side view of a fastener assembly in accordance with the principles of the invention inserted through aligned apertures in a pair of work pieces to be fastened.

In the following description, like reference numerals will be used to refer to like or corresponding elements in the different figures of the drawings. Referring now to the drawings with more particularity, in FIG. 1 there is shown a fastener 10 comprising a sleeve 12 and setting pin 14 for telescoping movement therein and useful for fastening together a plurality of work pieces 16 and 18. In the position shown in FIG. 1, the left side of work piece 16 is the access side of the work and the right side of work piece 18 is the blind side of the work.

The sleeve 12 and pin 14 are assembled together and have been inserted through aligned apertures formed in the work pieces 16 and 18. The aligned apertures are of a size such that the sleeve and pin may be quickly and easily inserted, but with a minimum of free clearance.

The sleeve 12 comprises a radially enlarged head 20 which is located on the access side of the work. The enlarged head 20 comprises in this embodiment an annular groove 22 which will facilitate the formation of a locking crown, as will be discussed in more detail below. The enlarged head is of the protruding-head type with a concave recess between it and the contacting work piece 16. Additionally, the sleeve 12 has an axial through-bore 24 with a reduced diameter portion 26 located at the head 20 of the sleeve 12. The opening of the through-bore of the sleeve at the blind side is rounded in this embodiment to facilitate insertion of the setting pin. A sleeve having other head shapes, for example a flush head, may also be used.

The setting pin 14 has an blind head 28 located on the blind side of the work. The pin 14 includes a pulling section 30 with pulling grooves, a shank 32 and the head 28. As shown more clearly in FIG. 2, the pin also includes a first locking groove 34, a second locking groove 36 and a break-neck groove 38. The break-neck groove is the weakest section of the pin and is designed to break at a predetermined force as will be discussed in more detail below. As shown in FIG. 1, at the junction of the first locking groove 34 and the head 28 is a tapered annular shoulder 40. The pin 14 also includes a stop shoulder 48 for stopping the motion of the pin into the sleeve upon reaching a certain point.

Relating the dimensions of the pin 14 to those of the sleeve 12, the diameter of the pulling section 30 and the shank 32 is slightly less than the minimum internal diameter of the through-bore 24 of the sleeve, including the reduced diameter section 26. With these relative dimensions, the pulling section and shank are free to move through the sleeve 12. However, in another embodiment, an annular ridge or other structure may be included in the fastener, such as on the pulling section or shank of the pin, to provide an interference fit so that the sleeve and pin will remain in an assembled condition during storage or insertion into the apertures of the work pieces.

The outer diameter of the pin head 28 is greater than the diameter of the through-bore 24 in which it is to be received and in many cases, is just slightly less than the outside diameter of the sleeve 12. This is to assure that the sleeve 12 will clamp the work pieces together as well as expand to fill the apertures of the work pieces as the pin 14 is pulled telescopically into the sleeve 12.

Figure 5:
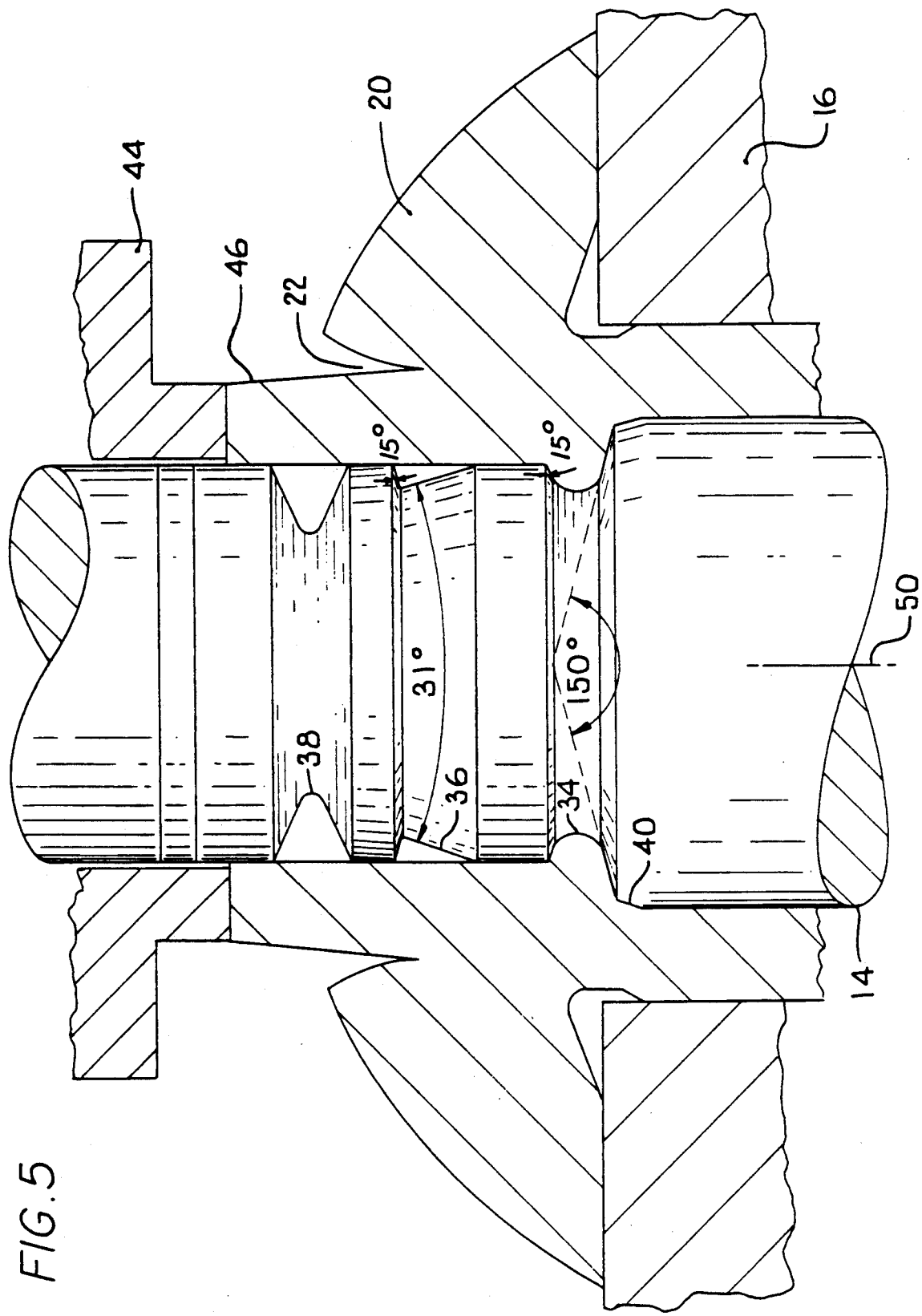
FIG. 5 is an enlarged view of the head of the sleeve when engaged with the pin showing detail of the pin locking grooves and the engagement of the first lock.

The diameter of the locking grooves is less than the diameter of the shank 32 of the pin so that they can be positioned within the reduced diameter section 26 of the sleeve 12. Referring to FIGS. 2 and 5, the first locking groove 34 has angles of 15° off both faces (included angle of 150°). The angle is measured from a line perpendicular to the longitudinal axis 50 of the pin. The second locking groove 36 has an angle off its face nearer the pulling section of approximately 15° (included angle of 150°) and an included angle off its face nearer the head of the pin 14 of 31°. The angle of the first annular taper 48 has an included angle of 150°. While the above angles have been found to be effective in one particular embodiment, other angles may be used in other embodiments.

The breakneck groove 38 is formed such that it will fracture upon application of a predetermined amount of pulling force. It is located at a point on the pin such that it will break the pin within the head 20 of the sleeve 12 when the fastener is in place in the work pieces. Determining the proper location for this groove requires consideration of the location of the stop shoulder 48, the reduced diameter section 26 of the sleeve, and the movement of the locking crown 46 in forming the second lock.

With the foregoing discussion of the construction of the sleeve 12 and pin 14 in mind, a description of a setting operation will now be given. As shown in FIG. 1, the fastener 10 is inserted through aligned apertures in the work pieces 16 and 18 which are presently separated from each other. The pin is partially inserted in the sleeve. Pulling force is applied to the pulling section 30 of the pin 14 to pull it into the through-bore 24 of the sleeve 12 as shown in FIG. 3. Shown in FIG. 3 is a pulling-head insert 44 which contacts the locking crown 46 of the sleeve head 20. Typically a setting tool, not shown, is used to pull the pin into the sleeve. Shown in the figures is a pulling-head insert 44 which could be part of a setting tool and is used to restrain the sleeve head 20 from moving while the pin 14 is being pulled into the sleeve 12. The details of setting tools are well known to those skilled in the art and no further details are given here.

As the pin 14 is pulled into the sleeve as indicated by force F1 in the FIGS., the blind end of the sleeve opposes the pulling. Continued pulling thereby expands the blind end of the sleeve and results in a force F3 as shown in FIG. 3. The pulling-head insert 44 applies force F2 against the locking crown to oppose the force F3 thereby holding the sleeve in position as the pin is being pulled into the sleeve.

As is shown in FIG. 3, the bulge in the sleeve 12 produced by pulling the pin into the sleeve from the blind end has resulted in moving the workpieces together and then clamping them between the blind end bulge and the sleeve head 20. Continued pulling has resulted in the pin head 28 being drawn into a decreased diameter as it enters the blind-side aperture of the workpiece 18. The tapered annular shoulder 40 of the pin has been displaced so that it remains on the blind side. In one embodiment, the tapered annular shoulder has a diameter at the access side of the taper which is just slightly less than that of the sleeve through bore 24 as is shown in FIG. 2. Also shown in FIG. 2 is the expansion of the sleeve 12 to fill the aperture in work piece 18.

Figure 4:
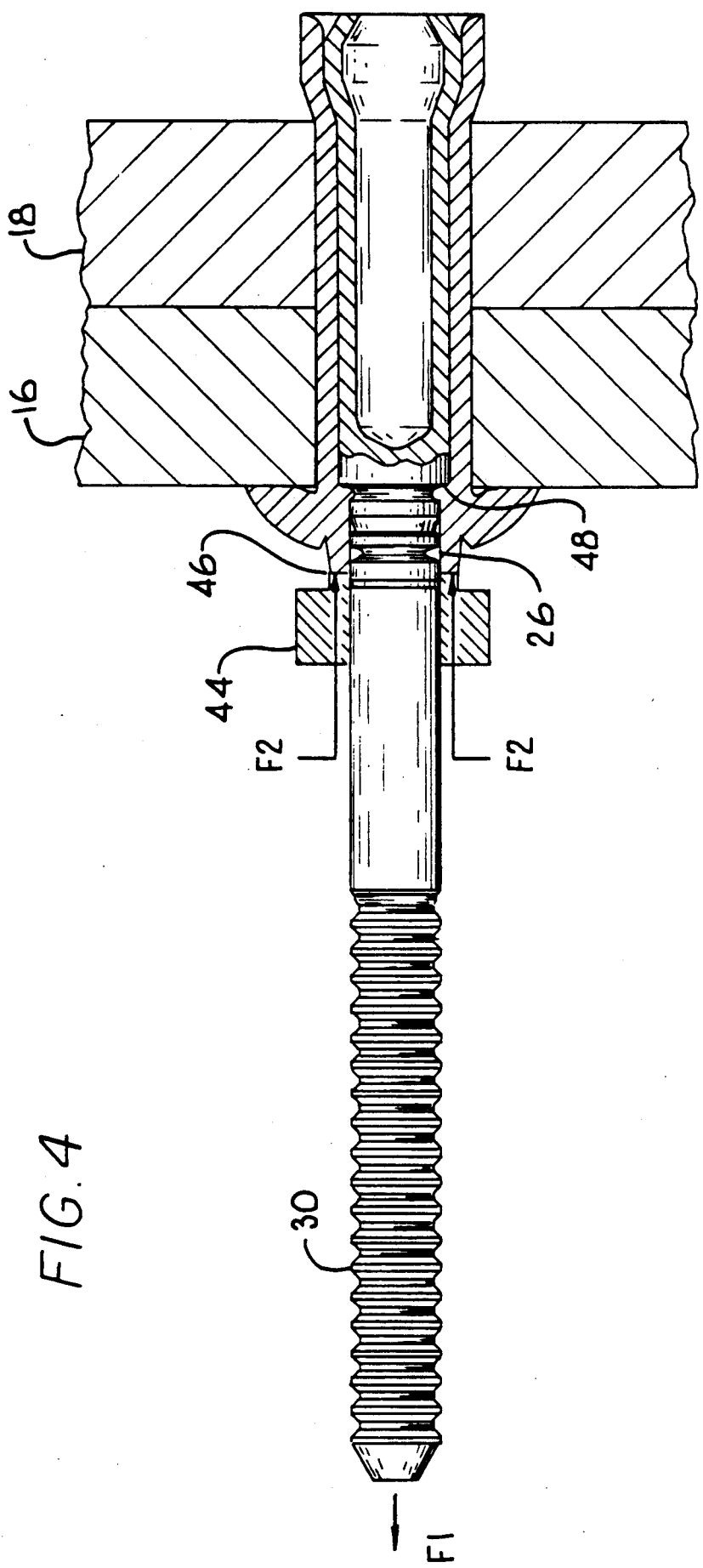
FIG. 4 is a partially cut-away side view of the fastener assembly showing the work pieces fastened together between the head of the sleeve and the bulged blind end of the sleeve and showing the first locking of the pin to the sleeve engaged.

Referring now to FIGS. 2, 4 and 5, as the pin continues to be pulled into the sleeve, the stop shoulder 48 encounters the reduced diameter section 26 of the sleeve 12. Further movement of the pin 14 into the sleeve 12 at this point meets sharply increased resistance. However, continued pulling results in some of the material of the reduced diameter section forming into the first locking groove 34 of the pin 14 as shown in FIGS. 4 and 5. The 15° angle off the face of the first locking groove 34 meets the reduced diameter section 26 and forms material into the groove until it is filled. At that time, no further movement of the pin towards the head 20 of the sleeve 12 occurs.

It is believed that as a result of continued pulling after the stop shoulder 48 contacts the reduced diameter section 26 of the sleeve, the pin taper in the first locking groove 34 deforms the reduced diameter section material and extrudes it into the locking groove 34. Continued pulling causes continued extrusion until the locking groove is full at which time the axial movement of the pin 14 stops.

Figure 6:
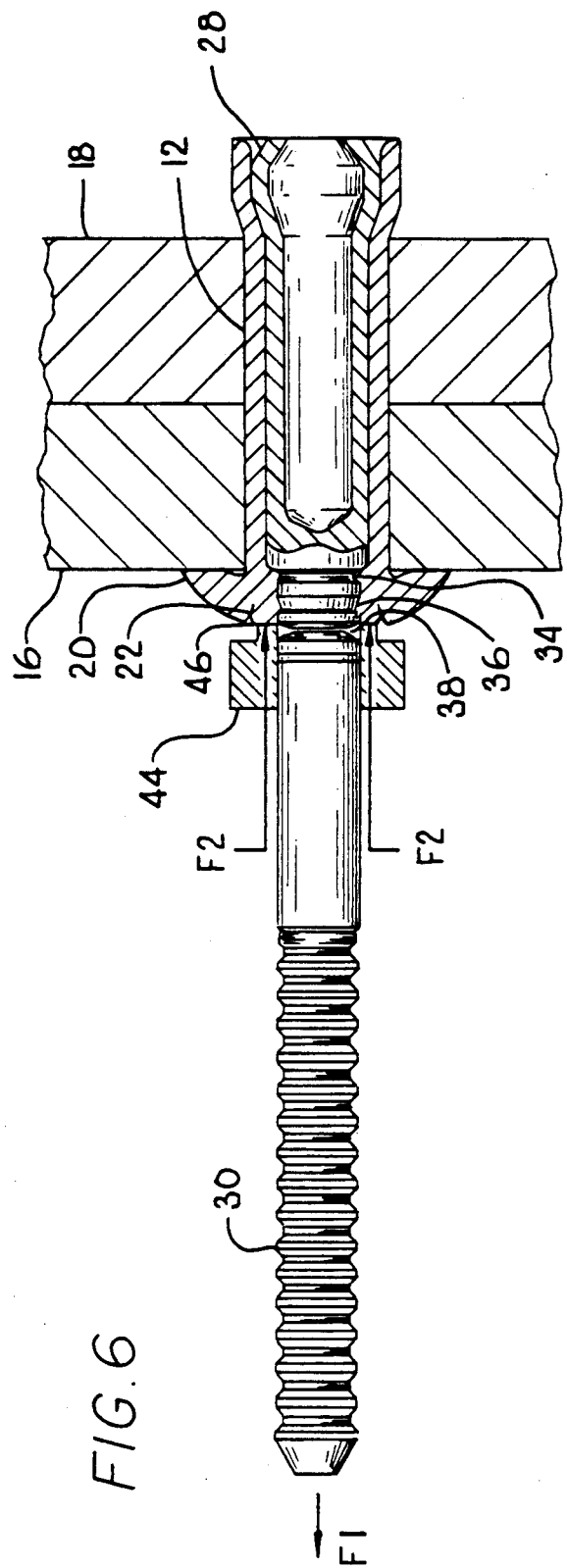
FIG. 6 is a partially cut-away side view of the fastener assembly showing the first and second pin locks engaged and the break-neck groove fractured.

Referring to FIG. 6, continued pulling force on the pin 14 will then cause the locking crown 46 to compress and some of its material will be formed into the second locking groove 36 of the pin. The locking crown compresses and forms material into the annular groove 22 of the head as well as the second locking groove. After compression, the locking crown does not extend beyond the curvature of the head 20 of the sleeve as shown in FIG. 6. After filling the second locking groove 36, continued pulling of the pin 14 will meet even more resistance. It is at this point that continued pulling will cause the break-neck groove 38 to fracture as shown. One of the features of the fastener formed in accordance with the principles of the invention is that the locking grooves essentially isolate any springback of the pin after fracture of the break-neck groove. The only section of the pin to experience springback is located between the second locking groove 36 and the break-neck groove 38. Thus, there is essentially no springback which could cause a loosening of the mechanical locks of the sleeve to the pin.

Thus, the bulged sleeve and undrawn portion of the pin at the blind side oppose the integral head at the other end of the sleeve 12 to clamp the work pieces together. Additionally, the expanded sleeve located in the apertures of the work pieces provides increased fatigue and shear strength to the fastened work pieces. The dual-locking feature of the pin in the sleeve resists any backing-out of the pin from the sleeve after assembly. Because of the strong lock provided by the invention, fasteners made in accordance with the invention may be used in high vibration and other adverse environments.

Although one embodiment of the invention has been shown and described in detail, it is to be understood that various changes in the details of construction and arrangement may be made without departing from the spirit and scope of the invention as defined in the appended claims.

What is claimed is:

1. A two piece blind fastener comprising:
   a hollow sleeve having a shank and an enlarged head at one end and an axial through-bore extending from end to end, the through-bore having a section of reduced diameter;
   a locking crown;
   a pin having a pulling section and an enlarged head at one end, adapted to be inserted into the through bore of the sleeve for pulling therethrough and further having a first locking groove, one side of which is higher than the other side, the higher side forming a stop shoulder for engaging the reduced diameter section of the sleeve and adapted to cause material of the reduced diameter section to form into the first locking groove to form a first pin lock and having a second locking groove for receiving the locking crown to form a second pin lock; and
   the enlarged pin head adapted to engage the sleeve shank and cause the sleeve shank to expand outwardly to form a blind head as the pin is pulled through the sleeve.

2. The blind fastener of claim 1 wherein the locking crown is adapted to engage the second locking groove after engagement of the first pin lock.

3. The blind fastener of claim 1 wherein the locking crown
   is an integral part of the enlarged sleeve head.

4. The blind fastener of claim 3 wherein the locking crown is adapted to engage the second locking groove to form the second pin lock after engagement of the first pin lock, and the locking crown remains an integral part of the sleeve head after engagement with the second locking groove.

5. The blind fastener of claim 1 wherein the stop shoulder comprises an included angle of less than 180°, the angle adapted to cause material of the reduced diameter section of the sleeve to form into the first locking groove upon applying pulling pressure to the pin after the stop shoulder of the pin has contacted the reduced diameter section of the sleeve.

6. The blind fastener of claim 5 wherein the locking crown
is an integral part of the enlarged sleeve head and remains an integral part of the sleeve head after engagement with the second locking groove.

7. The fastener of claim 1 further including a break-neck groove formed in the pin having a diameter selected such that the break-neck groove will fracture after the first and second locking means have been engaged.

8. The fastener of claim 1 wherein the enlarged head of the pin has a diameter such that pulling the head into the shank of the sleeve causes the sleeve to expand outwardly to clamp work pieces together and then to fill apertures in work pieces which are receiving the fastener.

9. The blind fastener of claim 1 wherein the stop shoulder comprises an included angle of approximately 150°.

10. The blind fastener of claim 1 wherein the angle of the stop shoulder is selected so that when engaging the reduced diameter section of the sleeve, the stop shoulder causes extrusion of material of the reduced diameter section into the first locking groove of the pin.

11. The blind fastener of claim 1 wherein the section of reduced diameter is disposed in the enlarged head of the sleeve.

12. The blind fastener of claim 1 wherein the second locking groove comprises an angle of less than 90° from the centerline of the pin pulling section, said angle being disposed on the side of the second groove which is toward the pulling section of the pin.

13. A two piece blind fastener comprising:
a hollow sleeve having a shank and an enlarged head at one end and an axial through-bore extending from end to end, the through-bore having a section of reduced diameter;
a pin having a pulling section and an enlarged head at one end, adapted to be inserted into the through bore of the sleeve for pulling therethrough and further having a first locking groove, one side of which is higher than the other side, the higher side forming a stop shoulder for engaging the reduced diameter section of the sleeve and adapted to cause material of the reduced diameter section to form into the first locking groove to form a first pin lock, the pin having a second locking groove;
the enlarged pin head adapted to engage the sleeve shank and cause the sleeve shank to expand outwardly to form a blind head as the pin is pulled through the sleeve; and
second locking means for forming material into the second locking groove of the pin for locking the pin in position in relation to the sleeve.

14. The blind fastener of claim 13 wherein the second locking means is engaged in response to applying continued pulling force on the pin after engagement of the first pin lock.

15. The blind fastener of claim 13 wherein the second locking means comprises a locking crown disposed in the enlarged sleeve head wherein the locking crown is formed into the second locking groove of the pin upon applying continued pulling pressure to the pin after engagement of the first pin lock.

16. The fastener of claim 13 further including a break-neck groove formed in the pin having a diameter selected such that the break-neck groove will fracture after the first pin lock and the second locking means have been engaged.

17. The fastener of claim 13 wherein the enlarged head of the pin has a diameter such that pulling the head into the shank of the sleeve causes the sleeve to expand outwardly to fill apertures in work pieces which are receiving the fastener.

18. The blind fastener of claim 13 wherein the stop shoulder comprises an included angle of approximately 150°.

19. The blind fastener of claim 13 wherein the stop shoulder comprises an included angle of less than 180°, the angle adapted to cause material of the reduced diameter section of the sleeve to form into the first locking groove, and the second locking groove comprises an angle of less than 90° from the centerline of the pin pulling section, said angle being disposed on the side of the second groove which is toward the pulling section of the pin.

20. The blind fastener of claim 13 wherein the section of reduced diameter is disposed in the enlarged head of the sleeve.

21. The blind fastener of claim 15 wherein the locking crown is an integral part of the enlarged sleeve head and remains an integral part of the sleeve head after engagement with the second locking groove.

22. A method for fastening comprising the steps of:
providing a hollow sleeve having a shank and an enlarged head at one end and an axial through-bore extending from end to end, the throughbore having a section of reduced diameter;
providing a pin having a pulling section at one end and an enlarged head at the other end, adapted to be inserted into the through bore of the sleeve for pulling therethrough and further having a first locking groove, one side of which is higher than the other side, the higher side forming a stop shoulder for engaging the reduced diameter section of the sleeve;
forming a second locking groove in the pin; disposing a locking crown in the enlarged head of the sleeve;
pulling the pin through the sleeve such that the enlarged pin head engages the sleeve shank and causes the sleeve shank to expand outwardly to form a blind head;
pulling the pin through the sleeve such that the pin stop shoulder engages the reduced diameter section of the sleeve and forms material of the reduced diameter section into the first locking groove to form a first pin lock; and
applying pulling force to the pin to engage a second lock to further lock the pin in position in relation to the sleeve comprising the step of forming the locking crown into the second locking groove of the pin after engagement of the first pin lock.

23. The method of claim 22 wherein the step of providing a pin comprises forming the stop shoulder with an included angle of approximately 150°.

24. The method of claim 22 wherein:
the step of providing a pin comprises forming the stop shoulder with an included angle of less than 180°;
the step of pulling the pin to engage the reduced diamter section comprises extruding material of the reduced diameter section into the first locking groove until movement of the pin in the sleeve stops; and thereafter
applying continued pulling force on the pin to engage the second pin lock.

25. The method of claim 22 wherein the step of providing a hollow sleeve comprises forming the sleeve such that the section of reduced diameter is disposed in the enlarged head of the sleeve.

26. The method of claim 22 wherein the step of disposing the locking crown in the enlarged sleeve head comprises forming it as an integral part of the enlarged sleeve head so that after engagement with the second locking groove the locking crown remains an integral part of the enlarged sleeve head.

27. The method of claim 22 wherein:

the step of providing the pin comprises forming the stop shoulder such that it comprises an included angle of approximately 150°;

forming a second locking groove in the pin having an angle of less than 90° from the centerline of the pin pulling section, said angle being disposed on the side of the second groove which is toward the pulling section of the pin;

the step of disposing the locking crown in the enlarged sleeve head comprises forming the crown as an integral part of the enlarged sleeve head such that after engagement with the second locking groove, the crown remains an integral part of the sleeve head;

the step of pulling the pin to engage the reduced diameter section comprises extruding material of the reduced diameter section into the first locking groove until movement of the pin in the sleeve stops; and thereafter forming the locking crown into the second locking groove.

* * * * *